May 6, 1952     S. SCHWORK     2,595,711

MOTOR VEHICLE TRAILER HITCH

Filed June 14, 1950

INVENTOR.

Stanley Schwork

BY *Victor J. Evans & Co.*

ATTORNEYS

Patented May 6, 1952

2,595,711

UNITED STATES PATENT OFFICE 2,595,711

MOTOR VEHICLE TRAILER HITCH

Stanley Schwork, Bangor, Pa.

Application June 14, 1950, Serial No. 167,955

1 Claim. (Cl. 280—33.44)

This invention relates to devices for temporarily attaching trailers to motor vehicles particularly of the pleasure type, and in particular a clamp of the C-type formed with upper and lower jaws having horizontally disposed flanges held together by a bolt on which a ball for receiving the socket on the forward end of the tongue of a trailer is positioned.

The purpose of this invention is to provide a trailer hitch that may readily be clamped on the bumper of a motor vehicle and in which the ball that receives the socket of the tongue of the trailer provides the clamping means for securing the hitch on a bumper.

Various types of clamps have been provided for mounting the ball over which a socket is positioned on a bumper or other part of a motor vehicle but the conventional clamp requires combinations of bolts and screws and is generally cumbersome. With this thought in mind this invention contemplates a substantially stream line clamp having an upper jaw and a lower jaw with the jaws clamped over the upper and lower edges of a bumper by a bolt the head of which forms the ball for receiving the socket of the tongue of the trailer.

The object of this invention is, therefore, to provide means for forming a trailer hitch that consists of comparatively few parts and in which the only bolt used for clamping the hitch to the bumper is the bolt that holds the socket of the tongue of the trailer to the bumper.

Another object of the invention is to provide a trailer hitch including a pair of jaws secured in clamping relation by the socket receiving ball wherein the jaws may readily be shaped to accommodate bumpers of different types.

Another object of the invention is to provide an improved trailer hitch including a pair of jaws held in gripping relation by the usual socket receiving ball in which means is provided for attaching the end of a chain to one of the jaws.

A further object of the invention is to provide an improved trailer hitch that is readily clamped to a bumper of a motor vehicle by the ball that receives the socket of the trailer which is of a simple and economical construction.

With these and other objects and advantages in view the invention embodies a pair of jaws formed of flat plates with hook shaped elements on the ends and with flanges extended from the meeting ends and a ball having a threaded stud with a nut on the end extended through the flanges.

Other features and advantages of the invention will appear from the following description taken in connection with the drawings wherein.

Figure 1:
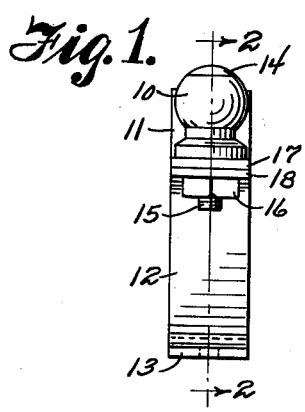
Figure 1 is a rear elevational view looking toward the end of the hitch upon which the ball is positioned.

Referring now to the drawings wherein like reference characters denote corresponding parts the improved hitch of this invention includes a ball 10, an upper gripping jaw 11, a lower gripping jaw 12 and a chain or attaching plate 13 whereby a chain from a towing vehicle may be attached to the hitch.

Figure 2:
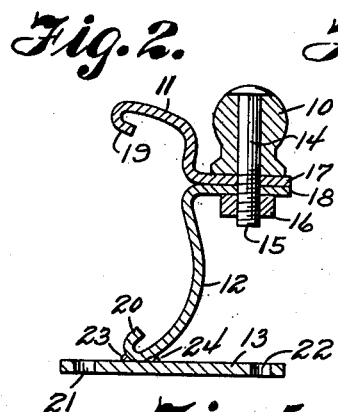
Figure 2 is a cross section through the hitch taken on line 2—2 of Figure 1.
Figure 3:
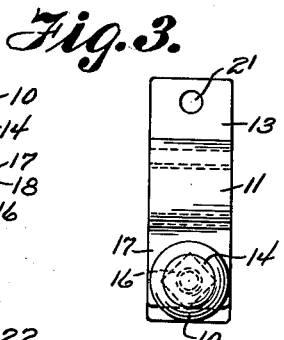
Figure 3 is a plan view of the hitch shown in Figure 1.

In the design shown in Figures 1, 2 and 3 the ball 10 is provided with a stud 14 having a lower threaded end 15 and a nut 16 threaded on the end 15 of the stud extends through flanges 17 and 18 of the jaws 11 and 12, respectively whereby the flanges are clamped together by the stud and nut with the hooks 19 and 20 of the jaws 11 and 12, respectively clamped over the upper and lower edges of a bumper.

The plate 13, the ends of which are provided with bolt holes 21 and 22 is secured to the lower jaw 12, preferably by welding as indicated at the points 23 and 24.

Figure 4:
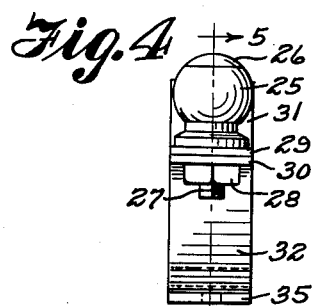
Figure 4 is an end elevational view similar to that shown in Figure 1 illustrating a hitch with the jaws shaped slightly different to the jaws shown in Figures 1 and 2.
Figure 5:
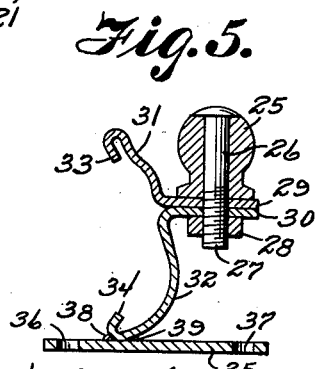
Figure 5 is a cross section through the hitch shown in Figure 4 taken on line 5—5 thereof.
Figure 6:
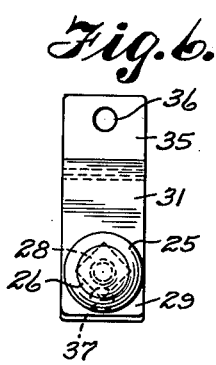
Figure 6 is a plan view of the hitch shown in Figure 4.

In the design illustrated in Figures 4, 5 and 6 a ball 25 is provided with a stud 26 with a threaded end 27 and a nut 28 holds the flanges 29 and 30 of the jaws 31, 32, respectively over the bumper of a motor vehicle with hooks 33 and 34 on the ends of the jaws fitted over the upper and lower edges of the bumper.

In this design a plate 35 with bolt holes 36 and 37 in the ends is secured to the jaw 32 preferably by welding as indicated at the points 38 and 39.

Figure 7:
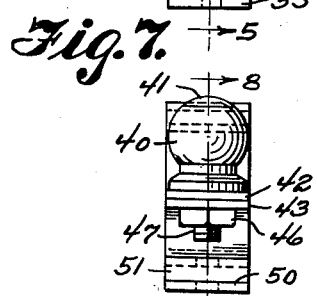
Figure 7 is also an end elevational view similar to that shown in Figure 1 showing a hitch with jaws of different forms.
Figure 8:
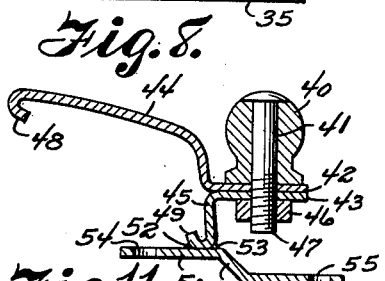
Figure 8 is a cross section taken on line 8—8 of Figure 7 showing the shape of the jaws of the hitch shown in Figure 7.
Figure 9:
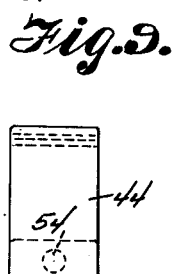
Figure 9 is a plan view of the hitch shown in Figures 7 and 8.

In the design illustrated in Figures 7, 8 and 9 a ball 40 with a stud 41 extended therethrough clamps flanges 42 and 43 of jaws 44 and 45, respectively over a bumper with a nut 46 on the threaded end 47 of the stud securing the jaws in clamping relation and with hooks 48 and 49 positioned over the edges of the bumper.

In this design a plate 50 with an offset 51 therein is secured preferably by welding as indicated at the points 52 and 53 to the jaw 45 and the extended ends of the plate are provided with bolt holes 54 and 55.

Figure 10:
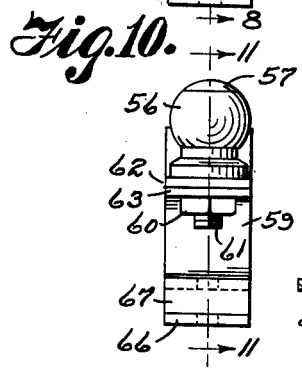
Figure 10 shows another end elevational view illustrating a hitch with gripping jaws of a still further pattern.
Figure 11:
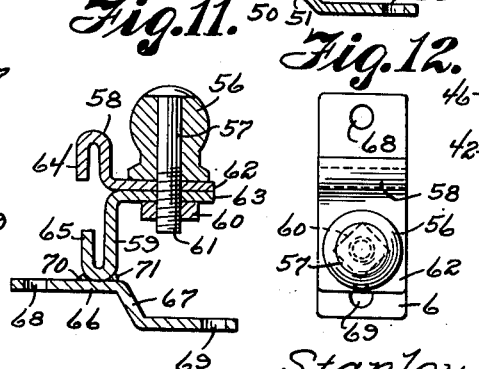
Figure 11 is a cross section taken on line 11—11 of Figure 10 illustrating the shape of the jaws and chain anchoring plate of the hitch shown therein.
Figure 12:
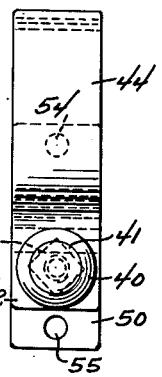
Figure 12 is a plan view of the hitch shown in Figures 10 and 11.

In the design illustrated in Figures 10, 11 and 12 the ball 56 having a stud 57 therein secures jaws 58 and 59 in clamping relation with a bumper or other part of a motor vehicle with the jaws held together by a nut 60 on the threaded end 61 of the stud 57 and with the stud extended through flanges 62 and 63 on the jaws 58 and 59, respectively. The jaws are provided with hook shaped elements 64 and 65, respectively and a plate 66 with an offset 67 therein and having bolt holes 68 and 69 in the ends is secured to the jaw 59, preferably by welding as indicated at the points 70 and 71.

With the parts arranged in this manner the jaws may readily be patterned to correspond with the shape of a bumper and the jaws may be bent to conform to the shape of the bumper or a plurality of hitches having jaws of different design may be carried in stock.

With a comparatively simple hitch of this type the hitch may be permanently mounted on the bumper or may be carried in a tool compartment of the vehicle to clamp on the bumper only when use thereof is desired.

It will be understood that other modifications may be made in the design and arrangement of the parts without departing from the spirit of the invention.

What is claimed is:

In a trailer hitch, a first and second jaw for engaging a vehicle bumper, each of said jaws being provided with a hook on one end and a horizontally disposed flange on its other end, said flanges being arranged contiguous to each other and provided with registering openings, a ball seated on the upper flange and having a threaded stud extending therethrough and through said registering openings, a securing element arranged in threaded engagement with the lower end of said stud and abutting the lower flange to clamp the jaws on the bumper, and a horizontally disposed plate secured to said lower jaw and provided with a plurality of openings therein.

STANLEY SCHWORK.

REFERENCES CITED

The following references are of record in the file of this patent:

UNITED STATES PATENTS

| Number | Name | Date |
|---|---|---|
| 2,488,415 | Klein | Nov. 15, 1949 |
| 2,506,090 | Lee | May 2, 1950 |

OTHER REFERENCES

Simplex Safety Trailer Couplers, received in U. S. Patent Office September 1, 1938.